US011362916B2

(12) United States Patent
Elliott et al.

(10) Patent No.: US 11,362,916 B2
(45) Date of Patent: Jun. 14, 2022

(54) VISUAL IDENTIFICATION OF A PORT AND A CABLE IN A NETWORK

(71) Applicant: International Business Machines Corporation, Armonk, NY (US)

(72) Inventors: Mark Keith Elliott, Alresford (GB); Gareth John Nicholls, Brockenhurst (GB); Katja Gebuhr, Southampton (GB); Lee Jason Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/930,096

(22) Filed: Jul. 15, 2020

(65) Prior Publication Data
US 2022/0021594 A1   Jan. 20, 2022

(51) Int. Cl.
*G08B 5/36* (2006.01)
*H04L 43/0811* (2022.01)

(52) U.S. Cl.
CPC ............ *H04L 43/0811* (2013.01); *G08B 5/36* (2013.01)

(58) Field of Classification Search
None
See application file for complete search history.

(56) References Cited

U.S. PATENT DOCUMENTS

| 8,934,340 | B1 * | 1/2015 | Mater | H04L 49/20 370/230 |
| 2007/0185987 | A1 * | 8/2007 | Dieberger | G06F 11/328 709/224 |
| 2010/0015847 | A1 * | 1/2010 | Jacks | H04L 43/0811 439/490 |
| 2015/0086211 | A1 | 3/2015 | Coffey et al. | |
| 2017/0187648 | A1 | 6/2017 | Kehrer et al. | |
| 2018/0306997 | A1 | 10/2018 | Petersen et al. | |

(Continued)

FOREIGN PATENT DOCUMENTS

WO   2017176825 A1   10/2017

OTHER PUBLICATIONS

Embrionix, "Application Notes: MSA SFP/SFP+, non-MSA SFP/SFP+, emSFP/emSFP+ Generic host pin out," https://www.embrionix.com/resource/MSA-SFP-SFP-plus-non-MSA-SFP-SFP-plus-emSFP-emSFP-plus-Generic-host-pin-out, printed Jun. 25, 2020, 10 pgs.

(Continued)

*Primary Examiner* — Mohamed Ibrahim
(74) *Attorney, Agent, or Firm* — Peter K. Suchecki

(57) ABSTRACT

Provided is a computer-implemented method, system, and apparatus for a visual identification of a port and a previously connected cable of a link in a network environment including a network switch or a network device. The apparatus having an LED arrangement at a port assembly configured for illumination at the port and configured to provide illumination via the cable to a remote end of the link. An identifier providing component controls the LED arrangement based on a unique attribute of the link including: detecting a status change of a link; obtaining the unique attribute related to the link from a layer of a protocol received on both ends of the link; selecting an identifier based on the unique attribute related to the link; and instructing the LED arrangement to be configured to provide a light output of the selected identifier.

20 Claims, 5 Drawing Sheets

(56) References Cited

U.S. PATENT DOCUMENTS

2019/0286211 A1* 9/2019 Polland ............... G06F 1/3206
2020/0059710 A1* 2/2020 Huang ............... H04B 10/502

OTHER PUBLICATIONS

Exfo, "Live fiber detection," https://www.exfo.com/en/products/field-network-testing/live-fiber-detection/?gclid=EAlalQobChMI67j4qr_a5AIVwbTtCh19XA-hEAMYASAAEglyg_D_BwE, accessed Jun. 25, 2020, 4 pgs.

Unknown, "Brief Introduction of TOSA, ROSA, and BOSA," http://www.fiber-optic-transceiver-module.com/brief-introduction-to-tosa-rosa-and-bosa.html, Dec. 7, 2015, accessed Jun. 25, 2020, 3 pgs.

Unknown, "HOST RT-nonnonMSA/gif," https://www.embrionix.com/storage/app/media/resources/HOST%20RT-nonnonMSA.gif, accessed Jun. 25, 2020, 1 pg.

Unknown, "LED Color SK6812," Technical Data Sheet, https://www.mouser.co.uk/datasheet/2/737/SK6812_LED_datasheet_-953546.pdf, accessed Jun. 25, 2020, 8 pgs.

Unknown, "What is Ethernet Auto-Negotiation?" https://www.fiberoptics4sale.com/blogs/archive-posts/95041222-what-is-ethernet-auto-negotiation, accessed Jun. 25, 2020, 3 pgs.

* cited by examiner

US 11,362,916 B2

VISUAL IDENTIFICATION OF A PORT AND A CABLE IN A NETWORK

BACKGROUND

The present disclosure relates to cable identification in a network environment, and more specifically to visual identification of a port and a previously connected cable of a link in a network environment.

Storage Area Networks (SAN) can contain many ports on a variety of devices within the system. For example, a host may contain around 6 Host Bus Adapter (HBA) cards with each card having 4 ports. A fiber channel switch for example can contain 48 or 96 ports, which can then be bridged to create fabrics of hundreds of ports. Storage controllers can have up to 32 ports per controller, with the backend storage system having an equal number of ports.

Servicing storage controllers, switches, or hosts can be a painful process when the user has to unplug all the cables from the ports and then reconnect the cables into the correct ports. Often this requires the user labelling each end of the cable before it is disconnected and keeping track of which cable goes where. This is time consuming, and problems arise when cables are not carefully labelled before they are unplugged.

This is a typical example problem for Storage Area Networks (SAN); however, a similar scenario is also a problem for other networked systems that have multiple connecting cables.

SUMMARY

According to an aspect of the present disclosure there is provided a computer-implemented method for providing a visual identification of a port and a previously connected cable of a link in a network environment. The computer-implemented method being carried out at a network switch and comprising: detecting a status change of the link to an online status; obtaining a unique attribute related to the link from a layer of a protocol received on both ends of the link; selecting an identifier based on the unique attribute related to the link; and instructing a light emitting diode (LED) arrangement to be configured to provide a light output of the selected identifier, wherein the LED arrangement is provided at a port assembly of the network switch for illumination at the port and configured to provide illumination via the cable to a remote end of the link. The method may be carried out at both ends of a link at the same time in order to provide matching visual identifications at a port and at a remote end of a cable previously connected to the port.

According to another aspect of the present disclosure there is provided a system for providing a visual identification of a port and a previously connected cable of a link in a network environment including a network device comprising: a memory and a processor communicatively coupled to the memory, the processor configured to perform a method comprising: detecting a status change of a link; obtaining a unique attribute related to the link from a layer of a protocol received on both ends of the link; selecting an identifier based on the unique attribute related to the link; and instructing an LED arrangement to provide a light output of the selected identifier, wherein the LED arrangement is provided at a port assembly of the network device for illumination at the port and configured to provide illumination via the cable to a remote end of the link.

According to another aspect of the present disclosure there is provided an apparatus for providing a visual identification of a port and a previously connected cable of a link in a network environment including a network switch or a network device, comprising: an LED arrangement provided at a port assembly configured for illumination at the port and configured to provide illumination via the cable to a remote end of the link; and an identifier providing component for control of the LED arrangement based on a unique attribute of the link including: a link status component for detecting a status change of a link; a unique attribute obtaining component for obtaining a unique attribute related to the link from a layer of a protocol received on both ends of the link; an identifier selecting component for selecting an identifier based on the unique attribute related to the link; and an LED instructing component for instructing the LED arrangement to be configured to provide a light output of the selected identifier.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1A:
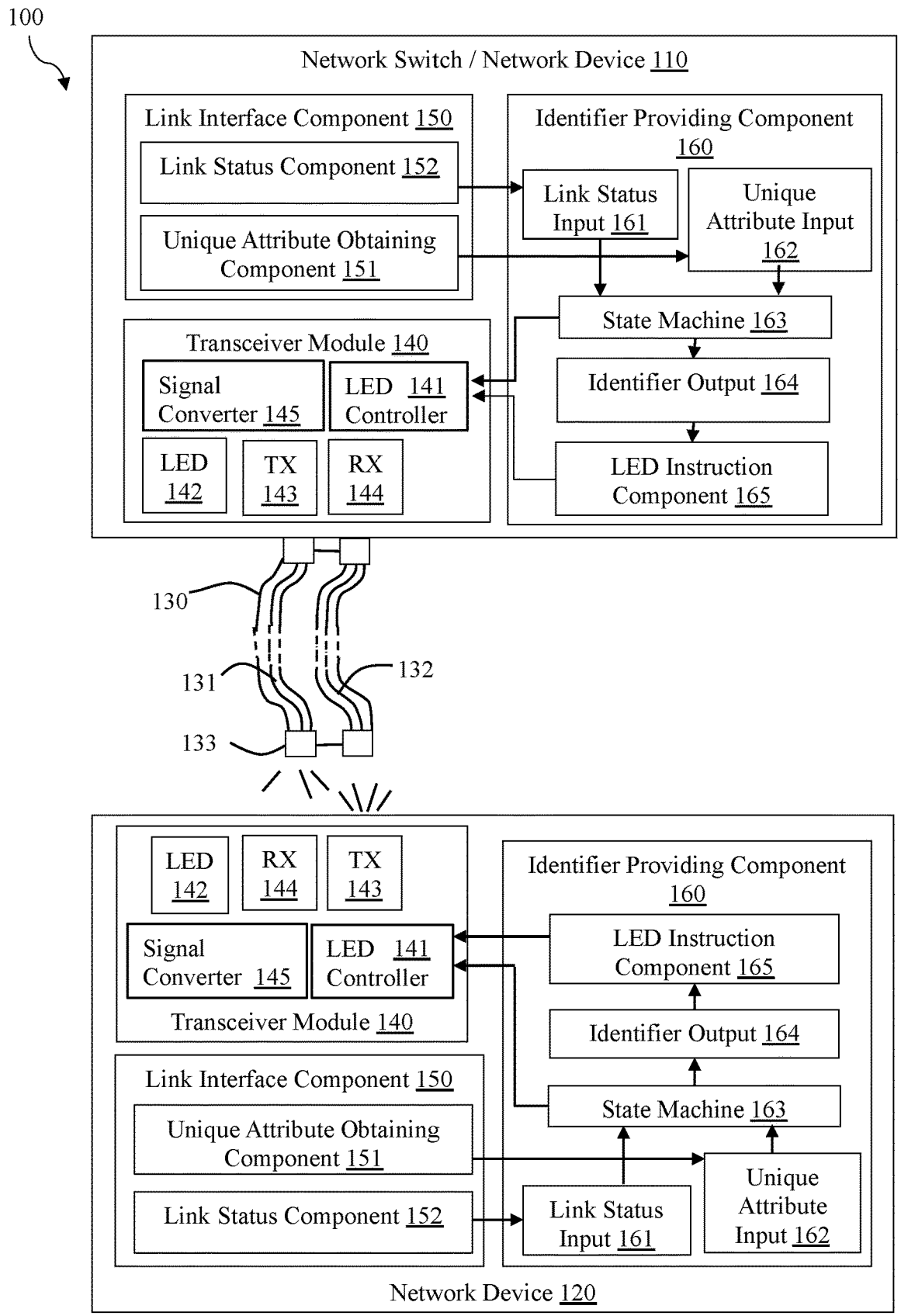
FIG. 1A illustrates a schematic diagram of an example arrangement of a network environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to cable identification in a network environment, and more particularly to visual identification of a port and a previously connected cable of a link in a network environment. While the present disclosure is not necessarily limited to such applications, various aspects of the disclosure may be appreciated through a discussion of various examples using this context.

A method, system, and apparatus are described for providing a matching visual identification at a port and at an end of a cable previously connected to the port. The cable provides a link in a network environment, which may be between a network switch and a network device connected to the network switch, or between two network devices in a direct attachment environment. A network switch may be a dedicated switch or may be a network device acting as a switch for channeling incoming data from multiple input ports to specific output ports and transferring data packets between network devices. The network device may be a computer, server, storage device, etc. For example, a network device might be a storage node or might be a host that runs applications that use storage via the network switch or switches.

The matching visual identification is provided by a light emitting diode (LED) arrangements disposed at each port of a network switch or a network device. The matching visual identification is independently decided by the network switch and the network device (or two directly connected network devices) when they are connected as being an emission identifier of the LED arrangement in the form of colors and/or a blinking pattern determined by a unique attribute of the link that can be obtained from a layer of a protocol of the link, such as from a transport layer or higher layer of the link.

The unique attribute of a link may be a reference that can be obtained from the signal transmitted on the link. This may be based on a port name, number, or address depending on the type of link and the transport protocol being used by the link.

An example of a unique attribute is a mathematical combination of a local and remote port name. A network device or a network switch at one end of a link can determine its local port name and the remote port name of the other end of the link from the transport layer or higher layer transmitted on the link. The identifier light output of the programmable LED arrangements at the link ends can be instructed based on the unique attribute obtained from the link when the link transitions to an online status.

An example of another form of the unique attribute may be the port name of a network device that is connected to a network switch, where the network device's port name can be determined by both the network switch and the network device itself from the transport layer or higher layer transmitted on the link.

The described method and system do not need an external controller that can communicate with both ends of the link to agree on the emission identifier; instead, the LED arrangement's identifier is set by a unique attribute of the link, which is obtainable from the link.

The LED arrangement is configured so that it can emit light out of the port if a cable is disconnected, or through the connected cable to a remote end of the cable if the cable is connected. In this way, if a cable is disconnected from a port while still attached at the other end of the cable, an LED arrangement at the port will emit the visual identification in the form of the identifier and an LED arrangement at the device still attached to the other end of the cable will emit the matching visual identification of the same identifier through the cable to the remote free end, such that the remote free end of the cable can be matched with the port and reinserted. If a cable is disconnected from both ports at either end of the cable, the LED arrangements at both ports may emit the visual identification in order to facilitate the reconnection of a cable at both ends.

The LED arrangement may include a programmable color LED at which a color can be programmed as a combination of red, green, and blue light to provide any color in the spectrum. The LED arrangement may also or alternatively be configured to be controlled to output an on/off pattern. In this way, the LED arrangement may provide a light output as an identifier in the form of a pattern of color changes and/or on/off changes (e.g., blinking).

The cable may be an optic cable through which the identifier light may be provided when the data signal is not being transmitted. Alternatively, the cable may be an electrical data signal cable and an additional light transmitting fiber or fibers may be provided along the length of the electrical cable for transmitting the identifier light.

When many ports are unplugged that are next to each other, then the individual LED emitting identifiers of the ports and the unplugged remote cable ends can be matched and reconnected. The identifying pattern of light color and on/off states may be quite different for each port compared to other nearby ports providing easy identification of correct cable reconnection.

Referring now to FIG. 1A, shown is a schematic diagram of an example arrangement of a network environment 100, in accordance with embodiments of the present disclosure. In some embodiments, the network environment 100 may include a network switch 110 connected to a network device 120. Alternatively, in some embodiments, the network environment 100 may include a network device 110 that is directly attached to another network device 120 without a switch, and one of the network devices may pretend to be, or act as, a switch allowing direct connection. In the description below, the arrangement of a connected network switch 110 and network device 120 is described; however, an equivalent arrangement with two directly connected network devices is envisaged.

A single connecting cable 130 is shown for illustration in FIG. 1A. However, in some embodiments, the network switch 110 and the network device 120 may have many ports with connecting cables 130. The cable 130 may be an optical cable having two glass fibers 131, 132 for sending data in opposing directions along the cable 130: One glass fiber for communication from the network device 120 to the network switch 110, and the other glass fiber for communication from the network switch 110 to the device 120.

Figure 1B:
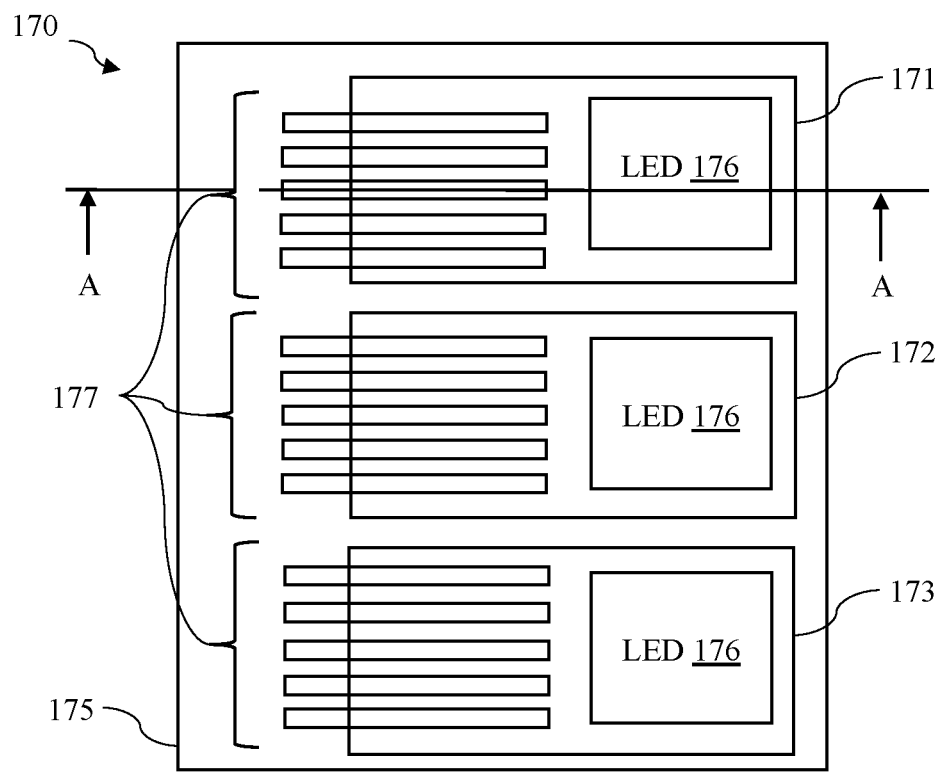
FIG. 1B and FIG. 1C illustrate schematic diagrams showing an example electrical link connector in accordance with embodiments of the present disclosure, with FIG. 1B being a plan view and FIG. 1C showing a cross-sectional view through line A-A of FIG. 1B.
Figure 1C:
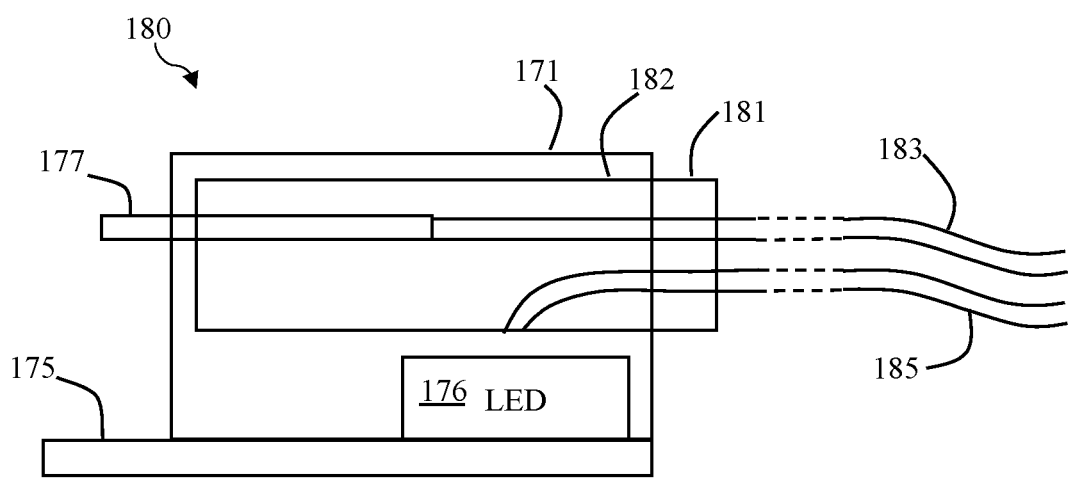

In some embodiments, the cable 130 may be a non-optical signal cable, such as an electrical signal cable, with an additional optical fiber cable provided in parallel with the dedicated purpose of transmitting LED light provided additionally to the non-optical data signal wires. An example of an arrangement for such a non-optical link is shown in FIG. 1B and FIG. 1C.

The cable 130 may be received at a transceiver module 140 at a network switch 110 and at a network device 120. In the case of an optical cable 130, there are usually identical optical transceiver modules 140 at each end of the optical cable 130 which are provided at a network adapter of a network device 120 or the network switch 110. The transceiver modules 140 may include signal converters 145 for converting the optical signals to electrical signals and vice versa. A common form of optical transceiver module 140 is a Small Form-factor Pluggable (SFP) that is a connector that translates the received optical signal into an electrical signal at the network switch 110 or network device 120, and vice versa for a transmitted signal.

When an optical cable 130 is disconnected from a port it is possible to see the end of the glass fibers and the optical I/O contacts of the port. In the described system, the optical transceiver modules 140 include an LED arrangement 142. The LED arrangement 142 may be color programmable to provide one of a range of color light outputs as well as a pattern of blinking as visual identification of identifiers of different ports. An identifier may be an identifying pattern of on/off blinking of the light and/or one or more colors of the light. Some example identifiers in the form of light outputs may include: the color red blinking off and then on every second; the color blue blinking off and then on every second; or the color red followed by the color blue and then off for one second and repeated.

The LED arrangement 142 is disposed in the transceiver module 140 in proximity to a port in order to illuminate the port when a cable 130 is disconnected and to provide light through the cable 130 when it is connected. In embodiments, more than one LED may be provided in an LED arrangement 142, and either the same or separate LEDs may be configured for illuminating the port and to provide light through the cable 130. The light of the LEDs of the LED arrangement 142 may be low power so that it will not damage the human eye.

A transceiver module 140 for an optical cable 130 may have a receiver port (RX) 144 and a transmitter port (TX) 143, and the LED arrangement 142 may be provided at the transmitter port 143. When a cable 130 is disconnected from a transceiver module 140, light from the LED 142 at the transmitter port (TX) 143 can be seen at the port. When the cable 130 is disconnected from the port, but remains connected at the other end, light from an LED 142 at a transmitter port (TX) 143 at the connected end of the optical cable 130 may be seen at the free end 133. The LED arrangement 142 may be provided at the receiver port 144 or at a bidirectional port, if provided.

In some embodiments in which the transceiver module 140 is an SFP, the LED arrangement 142 may be provided to emit light into the side of a fiber stub in the SFP at the transmitter port 143, so that the light will be seen at the open end of the cable of the transmitter face of the SFP.

In some embodiments, the LED arrangement 142 may be placed inside a Transmitter Optical Sub Assembly (TOSA), a Receiver Optical Sub-Assemblies (ROSAs), or a Bidirectional optical subassembly (BOSA). This may be done such that normal transition is not degraded and the LED identifier can easily be seen by a person. In some embodiments, it may be possible to mount the LED arrangement 142 on the printed circuit board of a network adapter or network switch and light pipe it to the TOSA, ROSA, or BOSA in the transceiver module 140 or just after it. Adding the LED arrangement 142 to the TOSA is preferred because an identifier of the LED in the ROSA or BOSA may cause some RX power to be generated which may provide confusion in the reading of the identifier. If the cable and transceiver modules are integrated such that the cable does not separate from the transceiver module, then the LED arrangement 142 may be mounted on the printed circuit board with access to the whole port.

The LED arrangement 142 has an LED controller 141 to instruct the LED arrangement 142 which identifier to emit and to control the on/off sequence of an identifier. In FIG. 1A, the LED controller 141 is shown at the transceiver module 140; however, this may be elsewhere on a network adapter or as software executed by a processor of the network device 120 or network switch 110.

Transceiver modules 140 are known to include microcontrollers that carry out functions such as temperature reporting, power setting and reporting, and controlling basic known LEDs that are provided for fault alarms or to indicate that a link is online. The LED controller 141 may be an existing microcontroller adapted to provide additional functionality to control the identifier of the LED arrangement 142 in response to received instructions.

The LED controller 141 may store a set of identifiers that may include on/off patterns and/or colors that can be requested by an identifier number; for example, 16 different on/off patterns and 16 different colors.

The LED controller 141 is instructed to control the LED arrangement 142 to emit an identifier based on a unique attribute of the link. The identifier is chosen per link and may be one of the port names or a combination of the port names of both ends of the link, such that each end of the link will set the same identifier.

In some embodiments, a combination of the local and remote port names of a link may be used to set the identifier of the LED arrangement 142 at both ends of the link. For example, the port names may be combined by adding together the bits of both port names that change between adjacent links and between adjacent network devices.

In some embodiments, the network device 120 port name may be used to set the identifier of the programmable LED arrangement 142 for both ends of the link. The network device port name may be used to set the identifier at both ends of the link because port 1 of a network device may go to port 1 of network switch 1 and port 2 of the network device may go to port 1 of network switch 2, so that one of the network switches can fail without the network device losing all of the paths to a particular host. However, if a network device has two nodes in an enclosure and both nodes may be unplugged at the same time, then it would best to use the bits of the network device port name that changes with the node as well as the bits which change between ports to set the identifier.

The link may use OSI model of layers. The network switch 110 and the network device 120 include a link interface component 150 with the link interface provided at a suitable layer of the OSI model to read the port name or names of the link. The link interface component 150 may include a unique attribute obtaining component 151 that gets or generates the unique attribute of the link, for example, by combining port names obtained from the link. The link interface components 150 of the network switch 110 and the network device 120 also include a link status component 152 for determining an online or other status of the link in the OSI model.

The network switch 110 and the network device 120 include an identifier providing component 160 for receiving inputs from the link interface component 150 in the form of a unique attribute input 162 of a link and the link status input 161 of the link. Using a state machine 163, the identifier providing component 160 may provide an identifier output 164 for the link. The identifier output 164 is used by an LED instruction component 165 to instruct the LED controller 141 as to what identifier to use to control the light output of the LED arrangement 142.

The state machine 163 may be added at an appropriate layer of the link interface to implement the control aspect of the LED arrangement 142. The state machine 163 does not need to know if a cable is plugged in or not. It can simply work from the state of the link in the OSI model.

Referring now to FIG. 1B and FIG. 1C, shown are schematic diagrams 170, 180 of an example electrical link arrangement in which an additional optic fiber 185 is provided with the purpose of transmitting the identifier light output in an arrangement parallel to the electrical link. In some embodiments, this form of arrangement may also be used in the case of an optical link where the transceiver modules are permanently attached to the optical cable.

FIG. 1B shows a plan view of an array of ports 171-173 of a network adapter or network switch printed circuit board (PCB) 175. Each port 171-173 has a plurality of electrical contacts 177 for mating between a cable plug 181 and a port socket 182 (as shown in FIG. 1C). Each port 171-173 has an LED arrangement 176 as previously described for providing an identifying light output.

FIG. 1C shows a cross-sectional view of the network adapter or network switch PCB 175 cut through the port 171 along line A-A of FIG. 1B. FIG. 1C shows a plug 181 inserted into the port socket 182. An electrical link is provided via electrical cables 183 in contact with the electrical contacts 177. An optical fiber 185 is provided in parallel with the electrical cables 183 and connected to the LED arrangement 176 and configured to transit the identifying light output when activated. The LED arrangement 176 may transmit the identifying light output at the port 171 when activated if the cable is disconnected at the port 171.

Figure 2:
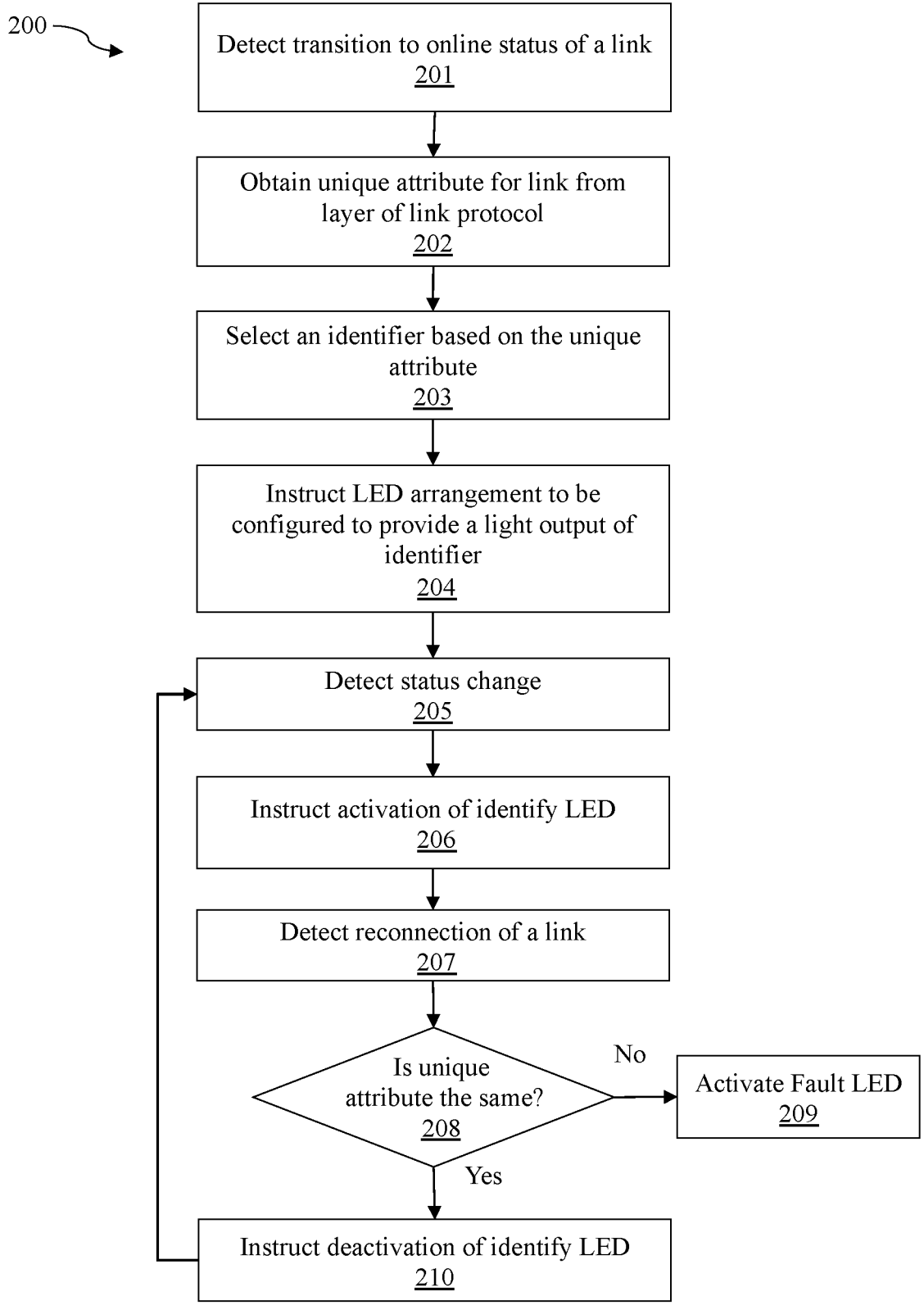
FIG. 2 illustrates a flow diagram of an example method as carried out independently at both ends of a link at a network device and at a network switch, or at both ends of two directly attached network devices, in accordance with embodiments of the present disclosure.

Referring now to FIG. 2, shown is a flow diagram of an example method 200 as carried out independently at both ends of a link at a network device 120 and at a network switch 110, or at both ends of two directly attached network devices, in accordance with embodiments of the present disclosure.

In embodiments, the method 200 must be executed at both ends of the link at the same time. Both ends of the link will identify at about the same time when the link is online, and both ends of the link must use the same unique attribute for the link to choose the identifier so that both ends of the link transmit the same identifying light output after the cable is disconnected. The identifying light output at each end of a disconnected cable will be the same, but may not be guaranteed to repeat at the same time. Other near-by links will transmit a very different identifying light output when disconnected and so will be easily recognized as relating to a different link.

The method 200 begins by detecting a status change of the link transitioning to an online status when a cable is plugged into ports at both ends of the cable such that a link comes online with OSI layers communicating information. This is illustrated at step 201. Once the status change is detected, the method 200 continues by obtaining a unique attribute related to the link, which may include obtaining information from a layer of the link protocol such as the transport layer or higher layer of a protocol of the OSI layer received on the link. This is illustrated at step 202.

In some embodiments, the unique attribute may be a combination of the local and remote port names of the link, and obtaining the unique attribute may include obtaining the local and remote port names and combining these mathematically to provide the unique attribute.

In some embodiments, the unique attribute may be the port name of the network device 120 connected to a network switch 110 and may include identification of a node of the network device 120 and a port on the node. If the method 200 is carried out at a network switch 110 or a network device acting as a switch, obtaining the unique attribute related to the link includes obtaining the port name of a connected network device 120 from the link with the connected network device 120. If the method 200 is carried out at a network device 120 that is not a network switch, obtaining 202 the unique attribute related to the link includes obtaining the port name of the port of the link on the network device 120 itself.

The method 200 continues by selecting an identifier for the LED arrangement for the link based on the unique attribute of the link. This is illustrated at step 203. An identifier may be an identifying light output of on/off blinking of the light (e.g., at one or more intervals) and/or one or more colors of the light. For example, a color of LED may be provided by a programmable color LED and may be selected with a blinking pattern to give additional combinations; additionally, the identifier may change between two different colors in a blinking pattern providing more combinations. The selection may be carried out by a state machine as described further below.

The LED arrangement is controlled to provide one of a plurality of light outputs as visual identification of identifiers of different ports, and once an identifier has been selected, the method 200 continues by instructing the LED arrangement to be configured to output the selected identifier via a controller of the LED arrangement. This is illustrated at step 204. The LED arrangement records the instruction but does not activate the LED arrangement to emit light at this stage.

The method 200 continues by detecting a status change. This is illustrated at step 205. When a subsequent status change is detected on the link that indicates that the link is no longer online, the method 200 continues by instructing an activation of the emission of the LED arrangement to output the light with the selected identifier. This is illustrated at step 206. This enables a user to see the identifier light at a port and at a disconnected free end of a cable, and match the two to easily reconnect the cable to the correct port.

In embodiments, the method 200 continues by detecting a reconnection of the link. This is illustrated at step 207. Once a reconnection of the link is detected, the method 200 may instruct a de-activation of the emission of the programmable LED arrangement.

In some embodiments, the link may come back online without the need to stop emitting the identifier light output. For example, this would apply where a separate optical cable transmits the identifier light output in parallel with an electrical link. In such embodiments, it may be detected that there is a subsequent online status of the link.

In some embodiments, the identifying light output may need to be stopped to allow the link to come back online. For example, this may be the case for some optical links including when the TX LED is used as the identifier emitting LED. In such embodiments, the reconnection of the link may be detected for an optical cable where light is sent down the signal cable and an increase in light power received is detected. Received power may be monitored, and if it stops being too low (the cable may have been reconnected), the identifying can be stopped at both ends to allow the link to come back online.

After detecting a reconnection at step 207, the method may continue by determining if the unique attribute on the new link is the same as previously used to instruct the LED arrangement. This is illustrated at step 208. If the unique attribute related to the link is detected as having changed ("No" at step 208), the method 200 continues by activating a fault alert LED. This is illustrated at step 209. The fault alert LED may be any type of alert, such as a blinking amber LED, as this indicates that the cable has been wrongly reconnected into a different port. An event may also or alternatively be logged on the network switch and/or the network device. There may also be a mechanism to prevent the state machine from providing a new identifier instruction for the link unless an override is provided.

If the unique attribute for the reconnected link is detected as being the same ("Yes" at step 208), then the method 200 continues by instructing deactivation of the LED arrangement. This is illustrated at step 210. If deactivation of the LED arrangement has not already occurred to allow the link to come back online, the method 200 may return to step 205 and wait for a subsequent status change to be detected that may require reactivation of the LED arrangement.

When multiple links are online, the network switch and the network devices should control each adjacent port to have a different identifier which is also communicated to the other end of the optical link. When the link interface detects that a link is down, then the LED arrangement will be activated with the identifier emission. A user can look at the color and/or pattern shining out of the end of the cable and find the same color and/or pattern shining out of one of the ports so that he will know that this cable should be plugged into this port.

The system may be implemented in an optical fiber network where the optical fibers transmitting signal data are used to also transmit the light identifiers. Some optical cables come with the optical transceiver modules permanently attached and would need the LED arrangement to be on a printed circuit board next to the port and light piped into the transceiver module.

In a specific embodiment implemented in a fiber optic network environment, an interface device (TOSA, ROSA or BOSA) may be modified to include a programmable color LED and the microcontroller (uC) of the interface device may be modified to control the identifying output of the LED (on/off and color). The protocol IC is modified to signal the identifying output to the microcontroller when the link becomes active and the World Wide Port Name (WWPN) of the device port is known, such that each different WWPN will be a different identifying output at both sides of the link. When the link is lost (for example, the optical cable has been unplugged) then the protocol IC may instruct the microcontroller to turn on the identifying output of the LED. Alternatively, if the microcontroller can reliably detect link loss, then it can turn on the identifying output of the LED. When the link comes back up after the optical cable is reconnected, then the identifying output of the LED can be turned off by the microcontroller or protocol IC.

The method and system may also be implemented in electrical cables by adding an optical fiber to the electrical cable plus an LED arrangement on the printed circuit board adjacent to the port so that an optical connection is made from the LED arrangement to the fiber when the cable is plugged in. Light from the LED arrangement would shine into the socket when the plug is removed as well as light coming out of the plug. In such an electrical cable implementation, the control at each end of the link would involve when the electrical link comes online controlling the identifier based on the unique attribute of the link and when the electrical link is not online then activating the emission of the LED arrangement.

Figure 3:
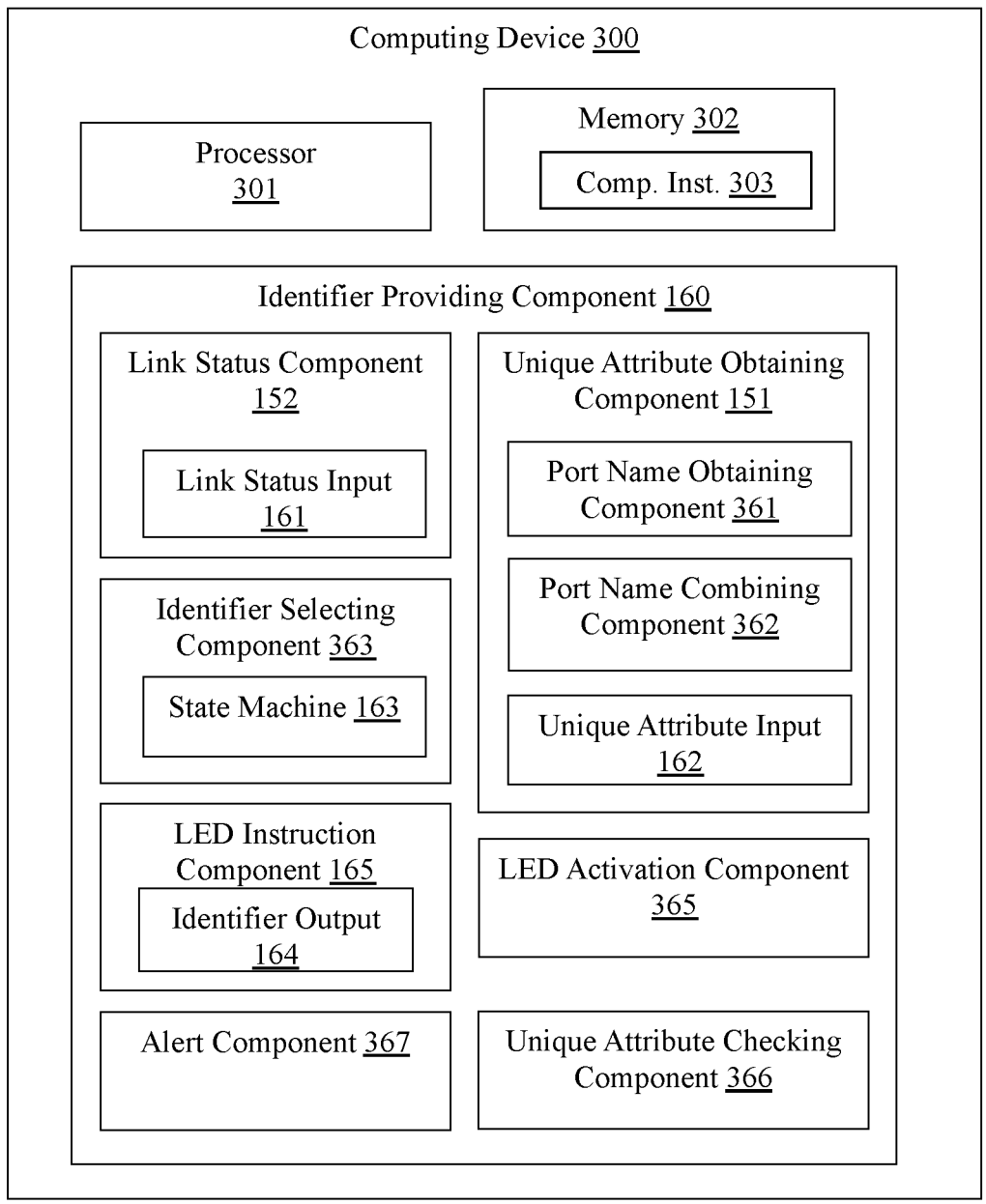
FIG. 3 illustrates a block diagram of a computing device having an identifier providing component which may be incorporated into a link interface of a network switch or a network device, in accordance with embodiments of the present disclosure.

Referring now to FIG. 3, shown is a block diagram of a computing device 300 having an identifier providing component 160 which may be incorporated into a link interface of a network switch 110 or a network device 120, in accordance with embodiments of the present disclosure. The computing device 300 may include at least one processor 301, a hardware module, or a circuit for executing the functions of the described components which may be software units executing on the at least one processor. Memory 302 may be configured to provide computer instructions 303 to the at least one processor 301 to carry out the functionality of the components. The instructions 303 may be executable by a processing circuit that is already present or may be implemented in electronics only on a network adapter card or network switch electronics.

The identifier providing component 160 may include a link status component 152 for detecting a status change of a link and providing a link status input 161 to an identifier selecting component 363 including the state machine 163. The identifier providing component 160 may also include a unique attribute obtaining component 151 for obtaining a unique attribute related to the link and providing a unique attribute input 162 to the identifier selecting component 363 including the state machine 163. The unique attribute obtaining component 151 may include a port name obtaining component 361 for obtaining one or both port names of a link, and a port name combining component 362 for combining a local and remote port name of a link to generate the unique attribute in the case where both port names are used for the link.

The identifier selecting component 363 selects, using the state machine 163, an identifier output 164 based on the unique attribute input 162 and the link status input 161.

The identifier providing component 160 may include an LED instruction component 165 for instructing the LED arrangement to be configured to provide a light output 164 of the selected identifier for the link.

The identifier providing component 160 may include an LED activation component 365 for instructing an activation of the LED arrangement to emit the light output of the selected identifier when the link status component 152 detects a subsequent status change of the link from an online status to a not online status.

The LED activation component 365 may also instruct a de-activation of the programmable LED arrangement when the link status component 152 detects a status change of the link to a reconnected status.

The identifier providing component 160 may include a unique attribute checking component 366 for, after detecting a status change of the line to an online status, checking if the unique attribute related to the link has changed and an alert component 367 for activating a fault alert LED if the unique attribute has changed.

Figure 4:
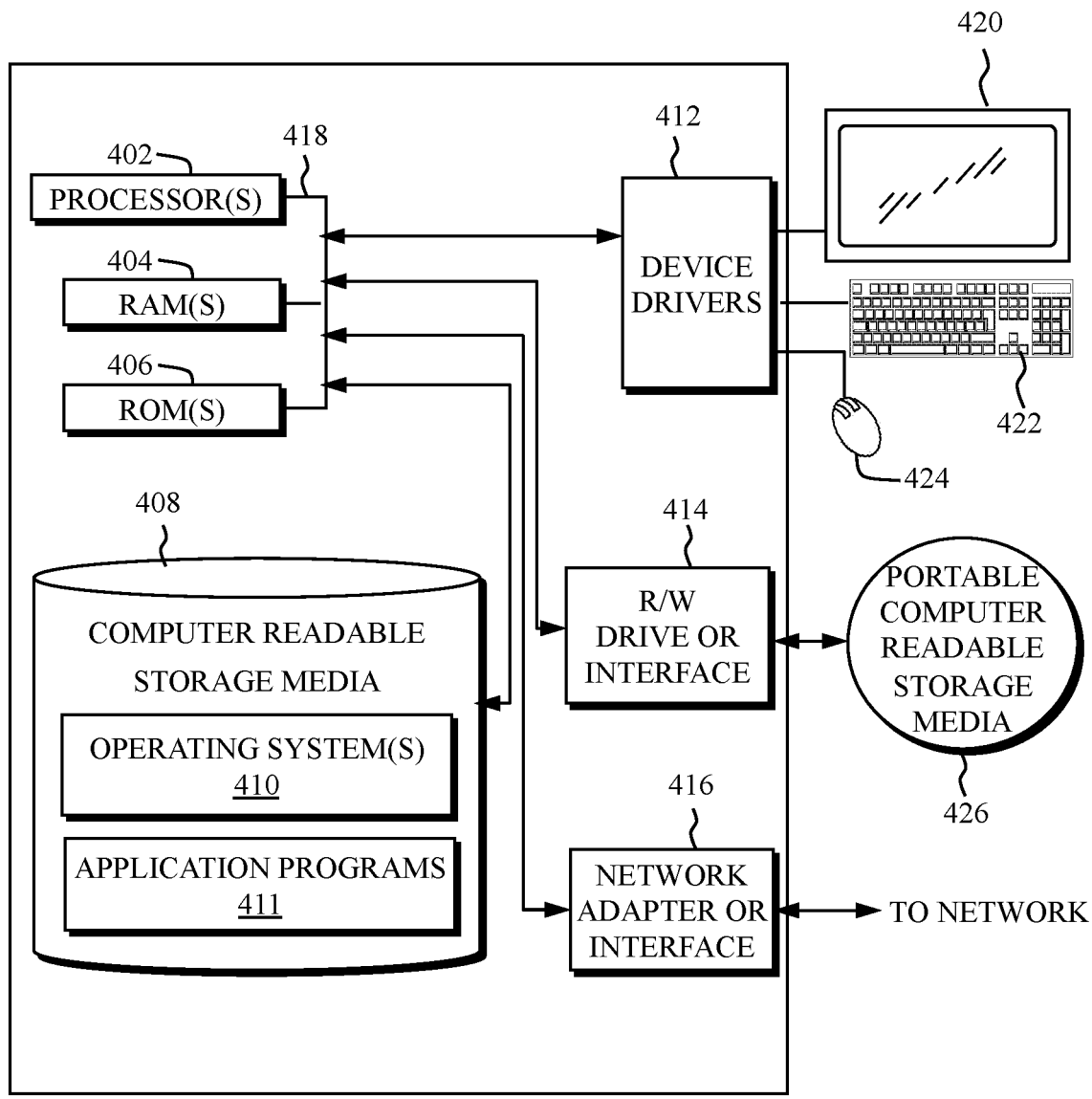
FIG. 4 illustrates a block diagram of an example computer system in which embodiments of the present disclosure may be implemented.

FIG. 4 depicts a block diagram of components of the computing device 300 of FIG. 3, in accordance with embodiments of the present disclosure. It should be appreciated that FIG. 4 provides only an illustration of one implementation and does not imply any limitations with regard to the environments in which different embodiments may be implemented. Many modifications to the depicted environment may be made.

Computing device 300 can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the identifier providing component 160 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

Computing device 300 can also include a R/W drive or interface 414 to read from and write to one or more portable computer readable storage media 426. Application programs 411 on computing device 300 can be stored on one or more of the portable computer readable storage media 426, read via the respective R/W drive or interface 414 and loaded into the respective computer readable storage media 408.

Computing device 300 can also include a network adapter or interface 416, such as a TCP/IP adapter card or wireless communication adapter. Application programs 411 on computing device 300 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device 300 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

According to a further aspect of the present disclosure there is provided a computer program product for providing a visual identification of a port and a previously connected cable of a link in a network environment, the computer program product provided at a network switch or at a network device and comprising a computer readable storage medium having program instructions embodied therewith, the program instructions executable by a processor to cause the processor to: detecting a status change of the link to an online status; obtaining a unique attribute related to the link from a layer of a protocol received on both ends of the link; selecting an identifier based on the unique attribute related to the link; and instructing an LED arrangement to be configured to provide a light output of the selected identifier, wherein the LED arrangement is provided at a port assembly of the network switch or network device for illumination at the port and configured to provide illumination via the cable to a remote end of the link.

The computer readable storage medium may be a non-transitory computer readable storage medium and the computer readable program code may be executable by a processing circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for providing a visual identification of a port and a previously connected cable of a link in a network environment, the computer-implemented method being carried out at a network switch and comprising:
   detecting a status change of the link to an online status;
   obtaining a unique attribute related to the link from a layer of a protocol received on both ends of the link;
   selecting an identifier based on the unique attribute related to the link;
   instructing a light emitting diode (LED) arrangement to be configured to provide a light output of the selected identifier, wherein the LED arrangement is provided at a port assembly of the network switch for illumination at the port and configured to provide illumination via the cable to a remote end of the link;
   detecting a subsequent status change of the link to a not online status in response to a first end of the cable being disconnected at the port of the remote end of the link; and
   instructing an activation of the emission of the LED arrangement to emit the light output of the selected identifier at the first end of the disconnected cable, wherein the light output of the selected identifier at the first end of the disconnected cable is substantially similar as a second light output illuminated at the port of the remote end of the link.

2. The computer-implemented method of claim 1, further comprising:
   detecting a reconnection of the link; and
   instructing a de-activation of the emission of the LED arrangement.

3. The computer-implemented method of claim 2, further comprising:
   determining, in response to detecting a reconnection of the link, if the unique attribute related to the link has changed; and
   activating, in response to determining the unique attribute has changed, a fault alert LED.

4. The computer-implemented method of claim 1, wherein obtaining a unique attribute related to the link obtains a local port name and a remote port name of the link and combines the port names to generate the unique attribute.

5. The computer-implemented method of claim 4, wherein the unique attribute is generated using a mathematical combination that combines bits of the local port name and the remote port name of the link.

6. The computer-implemented method of claim 1, wherein the method is carried out by a network device acting as a switch and wherein obtaining a unique attribute related to the link obtains a port name of a connected network device from a transport layer of a protocol received on the link from the connected network device.

7. The computer-implemented method of claim 6, wherein the port name includes identification of a node of the network device and a port on the node.

8. The computer-implemented method of claim 1, wherein the light output is a pattern of light blinking and/or a single color or multiple color combinations.

9. The computer-implemented method of claim 1, further comprising:
   in response to both ends of the cable being disconnected from the port of the remote end of the link and the port of the network switch, instructing an activation of the emission of the LED arrangement to emit the light output of the selected identifier at the port of the network switch, wherein the light output of the selected identifier at the port of the network switch is substantially similar as the second light output illuminated at the port of the remote end of the link.

10. The computer-implemented method of claim 1, wherein the LED arrangement is disposed in a Transmitter Optical Sub Assembly (TOSA).

11. A system, for providing a visual identification of a port and a previously connected cable of a link in a network environment including a network device comprising:
    a memory; and
    a processor communicatively coupled to the memory, wherein the processor is configured to perform a method comprising:
    detecting a status change of a link to an online status;
    obtaining a unique attribute related to the link from a layer of a protocol received on both ends of the link;
    selecting an identifier based on the unique attribute related to the link;
    instructing an LED arrangement to provide a light output of the selected identifier, wherein the LED arrangement is provided at a port assembly of the network device for illumination at the port and configured to provide illumination via the cable to a remote end of the link;
    detecting a subsequent status change of the link to a not online status in response to a first end of the cable being disconnected from the port assembly of the network device; and
    instructing an activation of the emission of the LED arrangement to emit the light output of the selected identifier at the port of the network device, wherein the light output of the selected identifier at the port is substantially similar as a second light output illuminated at the first end of the disconnected cable.

12. The system of claim 11, wherein the method further comprises:
    in response to detecting a status change of the link to a reconnected status, instructing a de-activation of the LED arrangement.

13. The system of claim 12, wherein the method further comprises:
    in response to detecting the status change of the link to the reconnected status, determining whether the unique attribute related to the link has changed; and
    activating a fault alert LED.

14. The system of claim 11, wherein the method further comprises:
obtaining a local port name and a remote port name of the link; and
combining the local and remote port names to generate the unique attribute.

15. The system of claim 11, wherein the system is provided at a network device acting as a switch, and wherein the method further comprises obtaining a network device port name from a transport layer or above of a protocol received on the link from a connected network device.

16. The system of claim 11, wherein the selecting the identifier comprises utilizing a state machine configured to take as inputs the link status and the unique attribute and output an identifier.

17. The system of claim 11, wherein instructing the LED arrangement to provide the light output comprises sending instructions to an LED controller selected from the group consisting of: a microcontroller at a network adapter; a microcontroller at a port assembly; and a controller at a networked device or a networking switch.

18. An apparatus for providing a visual identification of a port and a previously connected cable of a link in a network environment including a network switch or a network device, comprising:
an LED arrangement provided at a port assembly configured for illumination at the port if a cable end is unplugged at the port and configured to provide illumination via the cable to an unplugged remote end of the cable if the cable is plugged into the port; and
an identifier providing component for control of the LED arrangement based on a unique attribute of the link and including:
a link status component for detecting a status change of a link;
a unique attribute obtaining component for obtaining a unique attribute related to the link from a layer of a protocol received on both ends of the link;
an identifier selecting component for selecting an identifier based on the unique attribute related to the link; and
an LED instructing component for instructing the LED arrangement to be configured to provide a light output of the selected identifier.

19. The apparatus as claimed in claim 18, wherein the LED arrangement is provided at an optical cable port assembly and is configured to provide the illumination along one of the signal transmitting components of the optical cable.

20. The apparatus as claimed in claim 18, wherein the LED arrangement is provided at an electrical cable port assembly and is configured to provide the illumination along an optical fiber link additionally provided along the electrical cable.

* * * * *